United States Patent [19]

Wilkinson

[11] Patent Number: 4,585,844

[45] Date of Patent: Apr. 29, 1986

[54] PROCESS FOR PREPARING ACID DYEABLE ACRYLONITRILE POLYMER HAVING IMPROVED WHITENESS

[75] Inventor: William K. Wilkinson, Waynesboro, Va.

[73] Assignee: E. I. Du Pont de Nemours and Company, Wilmington, Del.

[21] Appl. No.: 635,747

[22] Filed: Jul. 30, 1984

Related U.S. Application Data

[63] Continuation-in-part of Ser. No. 521,912, Aug. 10, 1983, abandoned.

[51] Int. Cl.$^4$ .............................................. C08F 6/16
[52] U.S. Cl. ........................................ 526/84; 528/487
[58] Field of Search ................ 526/84, 85; 528/487

[56] References Cited

U.S. PATENT DOCUMENTS

| | | | |
|---|---|---|---|
| 2,709,163 | 5/1955 | Couper et al. | 525/327.1 |
| 3,065,211 | 11/1962 | Milford et al. | 526/195 X |
| 3,153,024 | 10/1964 | Thompson et al. | 526/84 |
| 3,219,643 | 11/1965 | Uchiyama et al. | 526/85 X |
| 3,310,541 | 3/1967 | Breuers et al. | 528/494 X |
| 3,428,485 | 2/1969 | Bonzagni | 525/327.6 |
| 3,488,329 | 1/1970 | Johnson | 525/327.6 |
| 3,700,631 | 10/1972 | Siclari et al. | 526/85 X |
| 3,736,304 | 5/1973 | Masson et al. | 528/487 X |
| 3,840,499 | 10/1974 | Di Giulio | 525/327.6 |
| 4,255,307 | 3/1981 | Miller | 528/487 X |

*Primary Examiner*—Paul R. Michl

[57] ABSTRACT

Acrylonitrile copolymers containing basic comonomers have improved color and color stability when the polymerization is carried out using a catalyst selected from the group consisting of hydrogen peroxide, alkyl and aryl hydroperoxides, acetyl and triacetone peroxides and alkali metal perborates and percarbonates along with an activator selected from the group consisting of 1-thioglycerol, 1-thiosorbitol and thioglycol and the polymerization mixture is quenched with a metal sequestering agent and a compound selected from the group consisting of $SO_2$, sodium bisulfite and sodium metabisulfite.

7 Claims, No Drawings

PROCESS FOR PREPARING ACID DYEABLE ACRYLONITRILE POLYMER HAVING IMPROVED WHITENESS

This application is a continuation-in-part of copending application Ser. No. 521,912 filed Aug. 10, 1983, abandoned.

This invention relates to an improved process for preparing polymers of acrylonitrile and N,N-dialkylaminoethylacrylates and methacrylates, optionally containing up to about 13% of a neutral ethylenically unsaturated monomer copolymerizable with acrylonitrile and the acrylate or methacrylate.

It is known from U.S. Pat. No. 3,065,211 to prepare copolymers of acrylonitrile and basic comonomers using relatively mild peroxide catalysts selected from the group consisting of hydrogen peroxide, alkyl and aryl hydroperoxides and alkali metal perborates and percarbonates in conjunction with an activator selected from the group consisting of 1-thioglycerol and 1-thiosorbitol. The resulting acid dyeable acrylonitrile polymers can be spun into fibers having improved initial whiteness and whiteness retention as compared to base modified acrylonitrile polymers prepared using ordinary persulfate catalysts and bisulfite activators.

It is known from U.S. Pat. No. 2,709,163 that copolymers of acrylonitrile and basic comonomers have improved initial color and color stability when the copolymers contain an amount of mono- or polysulfonic acid sufficient to substantially neutralize the basic comonomer in the copolymer.

It is known to use a dialkylaminoethylacrylate or methacrylate such as N,N-diethylaminoethylmethacrylate as a comonomer with acrylonitrile to provide copolymers which can be spun into acid dyeable fibers. However, these fibers have poor color and color stability even when prepared using the relatively mild peroxide catalysts of U.S. Pat. No. 3,065,211 or when neutralized according to U.S. Pat. No. 2,709,163.

It has now been found that copolymers of acrylonitrile and dialkylaminoethylacrylates and methacrylates, optionally containing up to about 13% by weight of a neutral comonomer polymerizable with acrylonitrile and the acrylate or methacrylate, having improved color and color stability can be prepared using a peroxy catalyst selected from the group consisting of hydrogen peroxide, alkyl and aryl hydroperoxides, acetyl and triacetone peroxides and alkali metal perborates and percarbonates used in conjunction with an activator selected from the group consisting of 1-thioglycerol, 1-thiosorbitol and thioglycol when the reaction mixture is quenched at the end of the polymerization with a sequestrant for heavy metals and a quenching compound selected from the group consisting of sulfur dioxide, sodium bisulfite and sodium metabisulfite. The function of the $SO_2$ or sulfite quenching agent is to destroy color-forming precursors along the polymer chain.

The alkyl groups contain 1-4 carbon atoms and preferably are methyl or ethyl, most preferably ethyl. Methacrylates are preferred. The preferred basic comonomer is N,N-diethylaminoethyl methacrylate (DEAM).

By the term "neutral ethylenically unsaturated monomer", it is meant those monomers which exhibit neither acidic nor basic reactions.

The process of the present invention may be carried out under widely varying conditions using aqueous solutions of the monomers. For example, the polymerization may be carried out in a batch or continuous manner. The monomer concentration in the polymerization medium may vary from about 10% to about 40% by weight, with the preferred concentration being from about 17% to 30% by weight. The amount of catalyst should be in the range from about 0.05% to about 10% by weight, based on the weight of monomers, and preferably from 0.1% to 2% for batch polymerization or for continuous polymerization during steady state conditions when polymer is being collected. For the start-up of a continuous polymerization, the concentration of catalyst is preferably held at a high level and may be gradually reduced over a period of a few hours to a lower concentration within the range just mentioned. The activator concentration is usually from about 0.1% to about 2% by weight, based on the weight of the monomers. The amount of $SO_2$ or bisulfite quenching agent is at least 10 mol % of the amount of peroxy catalyst used, preferably from 20% to 40%.

In carrying out the process of invention, the polymerization vessel should be well agitated. The temperature of the vessel is usually maintained in the range from about 15° C. to about 70° C. and the pH of the polymerization medium is usually adjusted to from about 2 to about 5. It is advantageous to carry out the polymerization in the lower end of this pH range, e.g., 2 to 3, particularly when a sodium bisulfite or sodium metabisulfite quench is being used. Polymers produced by the process of the invention have an intrinsic viscosity in the range from 0.8 to 3.0.

The initial color and color stability of the polymers may also be enhanced by using a low catalyst concentration.

TESTS

Solution Color

In the process of dry spinning, the polymer is dissolved in a volatile organic solvent and extruded into an evaporative atmosphere. One of the preferred solvents is N,N-dimethylformamide (DMF). Initial solution color as well as solution color after heating are important characteristics of a polymer to be spun into fibers. In the test, the polymer is dissolved in DMF and the optical density of the solution is measured using a Beckman ACTA II spectrophotometer.

Fiber Color

Fibers are evaluated for whiteness using a carded pad of staple fibers. Measurements are made on a Hunter Colorimeter Model D25M3 using as a standard of comparison a Hunter standard white MgO plate. The chromaticity dimension "b" measures yellowness.

Intrinsic Viscosity

Intrinsic viscosity is the limit of the natural logarithm of the ratio of the flow time of a dilute solution of a polymer to solvent flow time as the polymer concentration approaches zero. The measurements are made in DMF at 25° C.

In the examples, all parts are by weight unless otherwise indicated.

EXAMPLE 1

This example shows the effectiveness of $NaHSO_3$ for improving polymer and fiber color.

The preferred process of the present invention is continuous in an aqueous suspension system as generally taught in U.S. Pat. No. 3,065,211. This is a continuous steady-state redox polymerization in which all ingredients are metered to an agitated jacketed vessel, a representative portion of the contents overflowing constantly. Polymer and unreacted monomers are recovered from the overflowing slurry. The heat of reaction is removed by water circulating through the jacket.

The following ingredients are continuously fed:

|  | Parts by Weight, per minute |
| --- | --- |
| Demineralized water | 101.90 |
| Acrylonitrile | 31.80 |
| Methyl acrylate | 2.08 ⎫ in admixture |
| DEAM | 1.42 ⎭ |
| $H_2O_2$ | 0.35 dissolved in part of $H_2O$ feed, 1.0% on monomer |
| $H_2SO_4$ | 0.6 dissolved in part of $H_2O$ feed |
| $Fe^{++}$ | 0.00037 as ferrous ammonium sulfate in part of $H_2O$ feed |
| 1-Thioglycerol | 0.16 dissolved in part of $H_2O$ feed |

For test A, NaEDTA (sodium neutralized ethylenediaminetetraacetic acid) is added to the overflowing slurry in excess of that needed to sequester the iron. For test B, in addition to NaEDTA, 10.8 parts by weight per minute of 10% aqueous sodium metabisulfite is added.

The reactor has a working capacity up to the continuous overflow of 7700 parts. The residence time is 56 minutes. The temperature is controlled at 50°±2° C. The pH of the reaction mixture is 2.7 to 3.4. The DEAM content of the polymer is about 3.5% by weight. Overall conversion is 65% to 75%. The intrinsic viscosity of the polymer is 1.50 to 1.60. The polymer is removed by filtration, washed with water, again removed by filtration and dried at 110° C.

Fibers are obtained by conventional dry spinning and wash drawing to provide a 3 dpf yarn. Fiber color is measured on an air-blended sample of staple cup from the yarns using a Hunter Colorimeter Model D25M3.

| Test | Sequestering Agent | Quenching Compound | Fiber "b" Value |
| --- | --- | --- | --- |
| A | NaEDTA | — | 11.9–12.5 |
| B | NaEDTA | $NaHSO_3$ | 7.2–8.1 |

The use of $NaHSO_3$ provides a 4–5 unit lower fiber "b" value than fiber made without the $NaHSO_3$ quenching compound.

EXAMPLE 2

This example shows the effectiveness of low catalyst concentration for improving fiber color.

Polymer is prepared as in Example 1 except that 0.05 parts $H_2O_2$ (0.14% based on monomers) is used. In Test A', as in Test A in Example 1, NaEDTA, in excess of that needed to sequester the iron was added. Test B', as in B in Example 1, was quenched with 10.8 parts by weight of 10% aqueous sodium metabisulfite in addition to excess NaEDTA. Fibers were dry spun and wash drawn as in Example 1 and the fiber "b" values measured.

| Test | % $H_2O_2$ on Monomers | "b" Value |
| --- | --- | --- |
| A (Example 1) | 1.0 | 11.9–12.5 |
| A' | 0.14 | 5.7–6.3 |
| B (Example 1) | 1.0 | 7.2–8.1 |
| B' | 0.14 | 4.8 |

EXAMPLE 3

This example shows the effectiveness of $SO_2$ in inhibiting color development in acrylic polymers containing basic comonomers and in fibers prepared therefrom.

The procedure of Example 1 was repeated adding 13.9 parts by weight per minute of 3.4% aqueous NaEDTA and 16.6 parts by weight per minute 20% aqueous $Na_2S_2O_5$ to the overflow (test C). This test was repeated except 47 parts by weight per minute 0.3% aqueous $SO_2$ was substituted for the $NaHSO_3$ solutions (test D). Polymer solution color was determined by dissolving 2.5 g of polymer in 50 ml DMF and measuring the absorbance at 345 nm. Fibers were dry spun and wash drawn as in Example 1 and the fiber "b" values measured.

| Test | Sequestering Agent | Quenching Compound | Solution Color | "b" Value |
| --- | --- | --- | --- | --- |
| C | NaEDTA | $Na_2S_2O_5$ | 0.187 | 9.0 |
| D | NaEDTA | $SO_2$ | 0.105 | 7.7 |

EXAMPLE 4

This example shows the effective range of $NaHSO_3$ for improving color in acrylic polymers prepared with basic comonomers and in fibers prepared therefrom.

The polymerization procedure of Example 1 was repeated. In tests A, B and C 14.25 parts by weight per minute of 3.1 wt % aqueous NaEDTA was added to the overflowing slurry to sequester the iron. For test B, 4.68 parts by weight per minute of 20% aqueous sodium metabisulfite was added to consume all unreacted peroxy catalyst. For test C, 1.83 parts by weight per minute of 20% aqueous sodium metabisulfite was added to consume 40% of the unreacted peroxy catalyst. Fibers were dry spun and wash drawn as in Example 1 and the fiber "b" values measured.

| Test | Sequestering Agent | Quenching Compound | "b" Value |
| --- | --- | --- | --- |
| A | NaEDTA | — | 16.1 |
| B | NaEDTA | $NaHSO_3$ | 10.4 |
| C | NaEDTA | $NaHSO_3$ | 10.1 |

EXAMPLE 5

This example shows the effective range of $SO_2$ for improving color in acrylic polymers prepared with basic comonomers.

The polymerization procedure of Example 1 was repeated.

In tests D, E, and F, 12.22 parts by weight per minute of 3.1 wt. % aqueous NaEDTA were added to sequester the iron. For test D, the conditions of Test C were repeated. For test E, 0.24 parts by weight per minute of $SO_2$ was added to consume 40% of the unreacted peroxy catalyst. For test F, 0.12 parts by weight per minute of $SO_2$ was added to consume 20% of the unreacted peroxy catalyst. Polymer solution color was measured by dissolving 2.5 g of polymer in 50 ml DMF and measuring the absorbance at 345 nm.

| Test | Sequestering Agent | Quenching Compound | Solution Color |
|---|---|---|---|
| D | NaEDTA | NaHSO$_3$ | 0.233 |
| E | NaEDTA | SO$_2$ | 0.188 |
| F | NaEDTA | SO$_2$ | 0.172 |

What is claimed is:

1. In the process for acidic aqueous polymerization of an acrylonitrile composition wherein the polymerizable portion comprises from 85 to 99 by weight acrylonitrile, from 1 to 10% by weight of a basic comonomer which is an N,N-dialkylaminoethylacrylate or methacrylate, and up to 13% of a neutral ethylenically unsaturated monomer using less than about 10% by weight based on monomers peroxy catalyst selected from the group consisting of hydrogen peroxide, alkyl and aryl hydroperoxides, acetyl and triacetone peroxides and alkali metal perborates and percarbonates and an activator selected from the group consisting of 1-thioglycerol, 1-thiosorbitol and thioglycol, the improvement comprising quenching of the reaction mixture with a metal sequestering agent and at least 10 mol% based on the amount of peroxy catalyst of a quenching compound selected from the group consisting of SO$_2$, sodium bisulfite and sodium metabisulfite.

2. Process of claim 1 wherein the alkyl groups of the basic comonomer are ethyl groups.

3. Process of claim 2 wherein the basic comonomer is a methacrylate.

4. Process of claim 1 in which the polymerization is carried out at a pH of 2-3.

5. Process of claim 1 in which 0.1 to 2% by weight peroxy catalyst based on monomers is used.

6. Process of claim 1 wherein the molar concentration of quenching compound is between 20% and 40% based on catalyst.

7. Process of claim 6 wherein the quenching compound is SO$_2$.

* * * * *